United States Patent Office 3,363,426
Patented Jan. 16, 1968

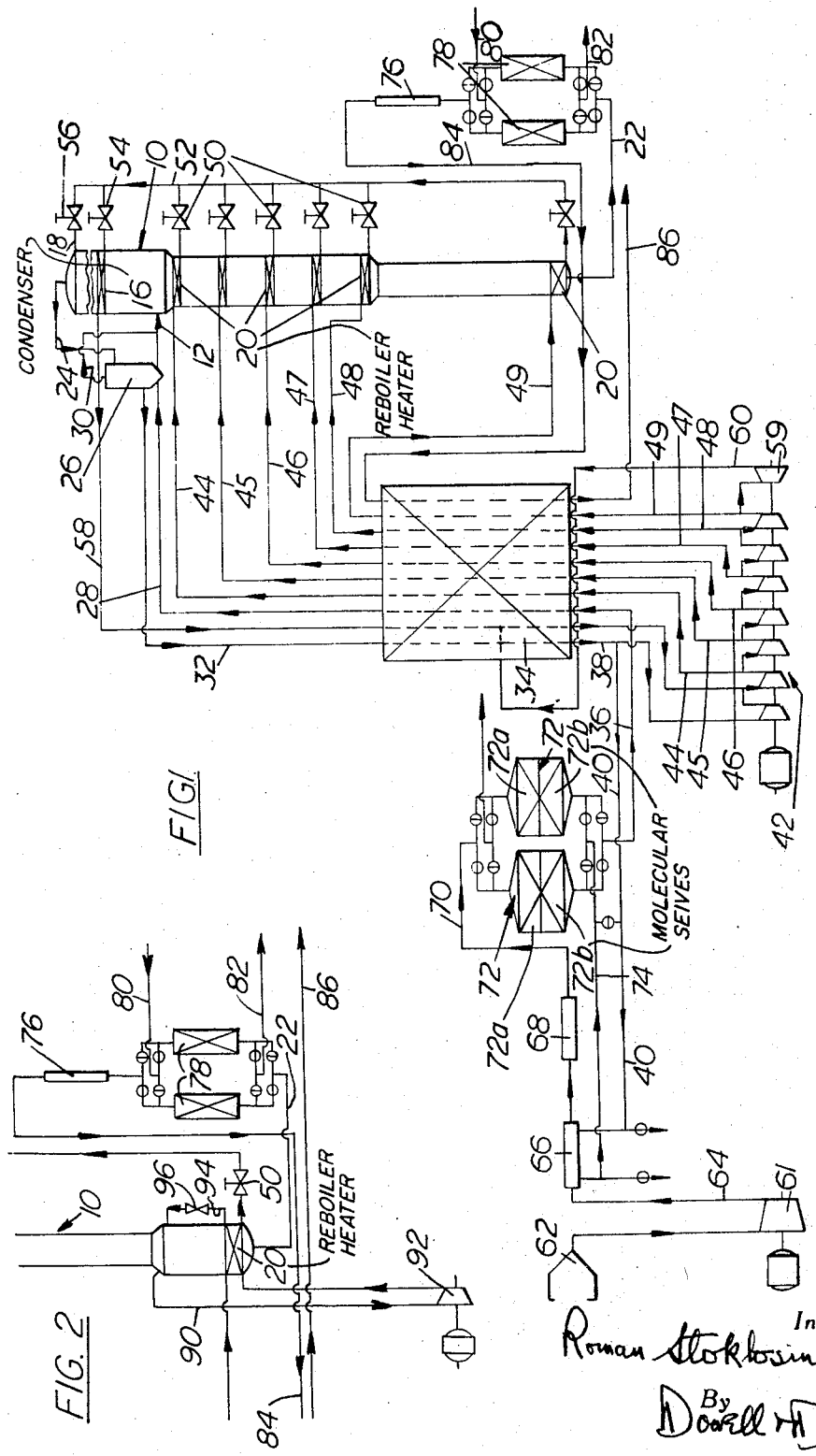

3,363,426
GAS SEPARATION WITH PARTICULAR REFERENCE TO AIR SEPARATION
Roman Stoklosinski, 30 Crockerton Road,
London, SW. 17, England
Filed Oct. 26, 1964, Ser. No. 406,227
Claims priority, application Great Britain, Oct. 29, 1963,
42,638/63
3 Claims. (Cl. 62—14)

This invention relates to fractional distillation, and especially the fractional distillation of air to obtain an oxygen product.

According to the present invention, there is provided a method of fractional distillation wherein the feed stock is introduced into a distillation column having distributed at intervals up its height a number of reboilers whereby a liquid fraction is obtained at the head of the column, and the withdrawn vapour fraction, or a proportion thereof, is used, after compression, as the heating medium in the reboilers.

More specifically, substantially pure oxygen is separated from a stream of air in accordance with the invention by feeding the air stream into a fractional distillation column having distributed up its height a number of reboilers whereby a liquid oxygen fraction is obtained in the sump of the column and a nitrogen vapour fraction appears at the head of the column, at least a proportion of the nitrogen vapour being compressed and used as the heating medium in the reboilers.

Preferably, condensation in the upper part of the column is effected by expanding the nitrogen leaving the reboilers and returning a part of it to the head of the column as liquid reflux while the remainder of the expanding nitrogen is used as the cooling medium in an indirect condenser disposed above the reboilers. After passing through the condenser, this latter part of the expanded nitrogen may then be recycled for recompression along with the nitrogen fraction withdrawn from the column.

Efficiency of the distillation column is obtained by providing a progressively decreasing reboiler temperature up the column. To this end the nitrogen fraction may be divided into a number of streams each of which is passed through only one of the reboilers, that is to say there is parallel flow through the reboilers, and each of which is conducted to its reboiler at a pressure, and hence a temperature, which is higher than that of the stream passing through the next reboiler above (if any) but less than that of the stream passing through the next reboiler below (if any).

The invention also includes plant for operating in accordance with the above technique.

In order that the invention may be more clearly understood two embodiments thereof will now be described, by way of example, with reference to the accompanying drawings in which:

FIGURE 1 is a flow diagram of a complete plant for carrying out the invention; and FIGURE 2 illustrates a modification of part of the plant depicted in FIGURE 1.

In the embodiment shown in FIGURE 1, a stream of air which, as will hereinafter be more fully explained, has already been cooled to a temperature such as to condense a small fraction, say about 2 percent, is continually admitted to a plate distillation column 10 at a point near the upper end thereof through a line 12. Within the distillation column 10 the rising portion of the air stream is partially condensed, to produce a descending oxygen-rich liquid fraction and an ascending nitrogen vapour fraction, by means of a condenser 16 and liquid nitrogen reflux introduced into the top of the column through a line 18.

Below the point of introduction of the air stream, the column 10 is equipped at intervals up its height with a number of reboiler heaters 20 (in the drawing six are shown) which fractionally distil the descending condensate produced in the upper portion of the column, thereby removing further nitrogen, as vapour, from the condensate which collects in the sump of the column as substantially pure liquid oxygen and which is continually withdrawn from the column through a line 22.

The nitrogen vapour given off during the distillation and the vapourised nitrogen reflux is withdrawn from the head of the column through a line 24 and is passed through an indirect heat exchanger or scrubber 26 where it flows countercurrently to the incoming air stream admitted to the heat exchanger through a line 28 at a temperature close to its dew point. The nitrogen gains heat from the air, a small fraction of which, as has been mentioned above, is in consequence condensed. The still gaseous air is passed out from the top of the heat exchanger 26 through a line 30 and is combined with the liquid air withdrawn from the bottom of the heat exchanger for admission to the distillation column through the line 12.

The purpose of condensing a small fraction of the air before it enters the column is to ensure that no gaseous carbon dioxide enters the column, any carbon dioxide in the air stream being taken up in the liquid fraction.

The nitrogen fraction leaves the heat exchanger 26 by way of line 32 and enters a compound indirect heat exchanger 34, which, although shown diagrammatically in the drawing, is preferably of the Narston Excelsior type and has a large number of countercurrent flow passages which are separate from one another but in thermal contact. Within this heat exchanger the nitrogen stream assists in cooling the air stream, which enters by a line 36, to near its dew point.

The nitrogen leaves the heat exchanger by a line 38. A part of it is withdrawn into a line 40 for purposes which will hereinafter be explained, while the remainder is conducted to the first of a number of stages of a compound compressor 42 which stages are connected together for series flow one to another, so that as the nitrogen passes through the compressor stages its pressure progressively increases. As the nitrogen stream passes through the series of compressor stages, of which seven are shown, small fractions are successively withdrawn from the output of stages two to seven through six lines 44–49. As will be clear from FIGURE 1 the pressure of the fraction withdrawn into line 44 will be lower than that withdrawn into line 45 which in turn will be lower than that withdrawn into line 46, and so on up to line 49 which receives the highest nitrogen fraction.

Each of the fractions within the lines 44–49 is passed through intercoolers (not shown) and an aftercooler (also not shown) and is then passed back into the heat exchanger 34. Each fraction leaves the heat exchanger 34 slightly superheated (about 5° C. above the boiling point) and is then conducted to one of the column reboiler heaters 20, that in line 49, which is at the highest pressure being led to the reboiler in the sump, that in line 44, which is at the lowest pressure to the uppermost reboiler heater and those in lines 45–48 to the intervening four reboiler heaters in descending order down the column.

Within the reboiler heaters 20, the nitrogen streams serve as heating medium for fractionally distilling the condensate in the column and as a result they condense. As the streams are at different pressures they will condense at different temperatures, i.e. that passing through the reboiler heater in the sump will condense at the highest temperature, and that passing through the uppermost reboiler heater will condense at the lowest temperature, and thus the temperature within the column will decrease progressively from the sump upwards.

On leaving the reboiler heaters, the nitrogen streams are further cooled by being passed through valves 50 which expand the streams to near the ambient pressure. The streams which by now are liquefied are all collected by the line 52, and then re-divided by the valves 54 and 56 into two fractions, one of which is conducted via a line 58 into and through the condenser 16 and the other of which is returned by the line 18 back into the top of the column as liquid reflux. Both fractions thus serve to condense the air stream entering the upper end of the column. The fraction which has flowed through the condenser 16 is recycled through the line 58 and the heat exchanger 34 to the second stage of the compressor 42.

As will be seen in FIGURE 1, not all the nitrogen admitted to the compressor 42 is sent to the reboiler heaters 20. A part of the nitrogen which is delivered from the final compressor stage is passed into an expander 59 which is directly coupled to the compressor and which expands the nitrogen back to the ambient pressure, thereby cooling it. The thus cooled nitrogen is conducted by a line 60 into an intermediate point of the heat exchanger 34 and combined with the nitrogen streams flowing to the compressor. The purpose of this step is to maintain the heat balance of the plant.

As has been mentioned above, a part of the nitrogen flowing to the compressor through the line 38 is withdrawn by the line 40. The fraction which is thus withdrawn is used in the initial air cooling and purifying steps as will now be described.

The air stream is drawn into the plant by an air blower 61 through a filter 62, which is preferably of the wet type, and which removes dust particles and the like. The air blower compresses the stream an amount sufficient to overcome frictional losses in the plant, for example to about 5 p.s.i.g. above the ambient pressure, and the air is then conducted by a line 64 to an indirect heat exchanger 66 in which it is cooled by heat exchange contact with the nitrogen fraction withdrawn into the line 40. The air stream is further cooled to a temperature of about 0–5° C. by being passed through a refrigerator 68.

From the refrigerator the air stream is conducted by a line 70 to a pair of regenerative driers 72, each of which has an upper bed 72a of silica-gel which adsorbs most of the moisture in the air, and a lower molecular sieve bed 72b for removing the remaining moisture and most of the carbon dioxide present in the air. Each drier is in turn reactivated by using a part of the nitrogen stream which has passed through the heat exchanger 66. The nitrogen, which leaves the heat exchanger 66 at a temperature of about 38° C., is conducted by a line 74, in which it is further heated by electrical means (not shown) to the high temperature required to re-activate the molecular sieve, to the particular drier whose turn it is to be re-activated, and is passed there-through until the re-activation of the molecular sieve is completed. Thereafter the electrical heating is discontinued and re-activation of the silica-gel proceeds at about 38° C. until complete, after which the drier can be cooled using waste nitrogen at about 7° C. The valves are then switched over and re-activation of the other drier is begun.

The air stream, which has thus been dried and substantially freed of carbon dioxide, is passed to the distillation column through the heat exchangers 34 and 26 as has been described above.

The final stage of the plant is the removal of hydrocarbons and the last traces of carbon dioxide from the liquid oxygen product which collects in the sump of the distillation column. This is effected by withdrawing the liquid oxygen from the sump and passing it through the line 22 to a pair of regenerative adsorbers 78 of any of the conventional types, the oxygen withdrawal being performed by a vapour lift pump 76 downstream of the adsorbers. The adsorbers are re-activated by that part of the nitrogen stream leaving the heat exchanger 66 which is not used for re-activating the driers 72. The re-activating nitrogen enters the adsorbers through a line 80 and leaves by a line 82.

The oxygen product leaves the adsorbers by a line 84 and after being passed through the heat exchanger 34, in which it assists in the cooling of the nitrogen streams, is delivered from the plant through a line 86.

The method which has been described can be used to produce on a large scale oxygen of about 90% purity. The most important advantage of the method is that, compared with the hitherto commercially used processes for the production of tonnage oxygen, it consumes substantially less power, and indeed under optimum conditions the power consumption may be only 55% of that required in the most efficient plants operating at the present time. The cost of production of the oxygen is thus considerably reduced.

A further important advantage of the method is that the plant required to carry it into effect is comparatively simple, and hence the capital cost of its installation is kept to a minimum.

In FIGURE 1, the distillation column 10 is shown as having six reboiler heaters 20. The efficiency of the fractional distillation of the liquid air can be enhanced by the provision of a larger number of reboiler heaters, but the plant becomes more complicated when more than six reboiler heaters are used and therefore six reboiler heaters is the preferred number.

Oxygen of very high purity (of the order of 99.5%) can be produced, if desired, by adopting the simple modification illustrated in FIGURE 2 which shows only the lower part of the distillation column 10, the remainder of the plant being identical to the described with reference to FIGURE 1.

The modification consists in withdrawing oxygen vapour from the lower end of the distillation column through a line 90. The oxygen is compressed a very small amount (about 1 or 2 p.s.i.g. above ambient pressure) in a compressor 92 and then passed into the sump reboiler heater 20 in which it becomes condensed as a result of losing heat to the liquid oxygen boiling in the sump. The oxygen is returned to the top of the sump portion of the column as liquid reflux through a line 94 containing a valve 96 which expands it back to the ambient pressure.

I claim:

1. A plant for the separation of oxygen from a stream of air comprising means for supplying a stream of dry substantially carbon dioxide free air, heat exchanger means for cooling said stream of air, means for feeding said cooled stream of air to a distillation column to a point near to the top of said column, means for providing reflux to separate said cooled stream of air into a top gaseous nitrogen product and a bottom liquid oxygen product, a series of reboiler heaters arranged up the height of said column, means for withdrawing gaseous nitrogen product from the top of said column and feeding said product in heat exchange with said stream of air, means for dividing said stream of nitrogen into a product stream and a second stream, a number of serially arranged compressors, means for feeding said second stream of nitrogen to said compressors, means for feeding a flow from each of said compressors in heat exchange with said nitrogen product and then to one of said reboiler heaters, the lowest pressure stream being fed to the uppermost reboiler heater and then progressively increased pressure streams being progressively fed to lower positioned reboiler heaters to provide a substantially uniform temperature change within the height of said column, means for expanding and cooling said flows of nitrogen from said reboiler heaters, means for collecting said cooled and expanded flows, feeding a part of said collected flow to the top of said column as reflux, a condenser in the top of said column for returning the remainder of said flow through said condenser to condense vapour in the top of said column as reflux, and means for removing oxygen product from the bottom of said column and positioning it in heat exchange with said stream of air.

2. A plant for the separation of oxygen from a stream of air comprising means for supplying a stream of dry substantially carbon dioxide free air, heat exchanger means for cooling said stream of air, means for feeding said cooled stream of air to a distillation column to a point near to the top of said column, means for providing reflux to separate said cooled stream of air into a top gaseous nitrogen product and a bottom liquid oxygen product, a series of reboiler heaters arranged up the height of said column, means for withdrawing gaseous nitrogen product from the top of said column and feeding said product in heat exchange with said stream of air, means for dividing said stream of nitrogen into a product stream and a second stream, a number of serially arranged compressors, means for feeding a flow from each of said compressors in heat exchange with said nitrogen product and then to one of said reboiler heaters, the lowest pressure stream being fed to the uppermost reboiler heater and the progressively increased pressure streams being progressively fed to lower positioned reboiler heaters to provide a substantially uniform temperature change within the height of said column, means for expanding and cooling said flows of nitrogen from said reboiler heaters, means for collecting said cooled and expanded flows, feeding a part of said collected flow to the top of said column as reflux, a condenser in the top of said column for returning the remainder of said flow through said condenser to condense vapour in the top of said column as reflux, means for removing oxygen product from the bottom of said column and positioning it in heat exchange with said stream of air and means for withdrawing substantially pure oxygen product from the bottom of said column and feeding it in heat exchange with said flow of air.

3. A plant according to claim 2 in which the means for supplying a stream of dry substantially carbon dioxide free air include a pair of regenerative dryers, each of said dryers comprising an upper bed of silica gel and a lower bed of molecular sieves, means for supplying compressed input air to one of said dryers so as to pass first through said upper bed and then through said lower bed and means for regenerating the other of said dryers including a heat exchanger through which said compressed air is passed before passage through said dryer and through which nitrogen top gaseous product is passed in heat exchange with said compressed air and conduit means for supplying said nitrogen from said heat exchanger to said dryer being regenerated so as to pass through said dryer from said lower bed to said upper bed, and means for passing said compressed air into said regenerated dryer and passing said nitrogen product through said first dryer to regenerate it.

References Cited

UNITED STATES PATENTS

| | | | |
|---|---|---|---|
| 1,880,981 | 10/1932 | Pollitzer et al. | 62—31 |
| 2,433,536 | 12/1947 | Van Nuys | 62—31 |
| 2,503,265 | 4/1950 | Haynes | 62—26 X |
| 2,627,731 | 2/1953 | Benedict | 62—30 X |
| 2,729,954 | 1/1956 | Etienne | 62—31 X |

OTHER REFERENCES

Canadian Chemical Processing, March 1963, vol. 47, No. 3, "Molecular Sieves Are Advantageous," pp. 51 and 52.

NORMAN YUDKOFF, *Primary Examiner.*

V. W. PRETKA, *Assistant Examiner.*